(12) United States Patent
Tripp

(10) Patent No.: US 6,515,846 B1
(45) Date of Patent: Feb. 4, 2003

(54) CAPACITOR SUBSTRATES MADE OF REFRACTORY METAL NITRIDES

(75) Inventor: Terrance B. Tripp, Westborough, MA (US)

(73) Assignee: H.C. Starck, Inc., Newton, MA (US)

(*) Notice: Subject to any disclaimer, the term of this patent is extended or adjusted under 35 U.S.C. 154(b) by 0 days.

(21) Appl. No.: 09/499,857

(22) Filed: Feb. 7, 2000

Related U.S. Application Data

(60) Provisional application No. 60/171,835, filed on Dec. 22, 1999, provisional application No. 60/159,999, filed on Oct. 18, 1999, provisional application No. 60/159,998, filed on Oct. 18, 1999, provisional application No. 60/145,553, filed on Jul. 23, 1999, provisional application No. 60/144,961, filed on Jul. 21, 1999, and provisional application No. 60/119,010, filed on Feb. 8, 1999.

(51) Int. Cl.7 .............................................. H01G 9/145
(52) U.S. Cl. .................... 361/508; 361/509; 361/303; 361/305; 361/321.1; 438/253; 438/396; 257/295; 257/298
(58) Field of Search ......................... 361/508, 433, 361/523, 509, 540, 525, 528, 529, 302, 311, 313, 303, 305, 321; 437/190, 192; 257/295, 298, 300; 438/240, 376, 253

(56) References Cited

U.S. PATENT DOCUMENTS

| | | | | |
|---|---|---|---|---|
| 3,654,523 A | * | 4/1972 | Markarian et al. | 317/230 |
| 4,164,528 A | * | 8/1979 | Yajima et al. | 264/62 |
| 4,664,883 A | * | 5/1987 | Melody et al. | 419/2 |
| 4,816,424 A | * | 3/1989 | Watanabe et al. | 437/190 |
| 5,216,572 A | * | 6/1993 | Larson et al. | |
| 5,380,673 A | * | 1/1995 | Yang et al. | |
| 5,717,242 A | * | 2/1998 | Michael et al. | |
| 5,959,831 A | * | 9/1999 | Maeda et al. | 361/523 |
| 6,181,547 B1 | * | 1/2001 | Finello et al. | 361/512 |
| 6,346,746 B1 | * | 2/2002 | Agarwal | |

* cited by examiner

Primary Examiner—Dean A. Reichard
Assistant Examiner—Nguyen T Ha
(74) Attorney, Agent, or Firm—Joseph C. Gil; Diderico van Eyl

(57) ABSTRACT

Metal nitride compound powder substrate for capacitor anodic oxide film and the substrate interface therebetween, characterized, relative to un-nitrided analogs, by reduced temperature bias and frequency dependencies of capacitance, the substrate-anodic oxide interface being substantially insensitive to heating compared to the un-nitrided analog.

11 Claims, 2 Drawing Sheets

Pellet nitrogen and oxygen as a function of sintering temperature.

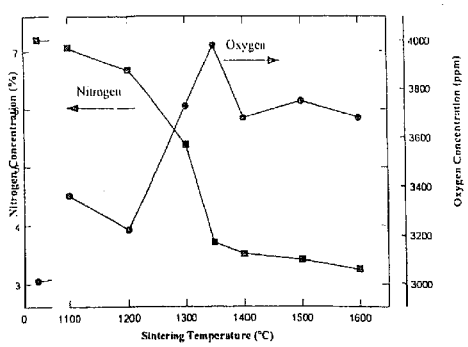

Figure 1 Pellet nitrogen and oxygen as a function of sintering temperature.

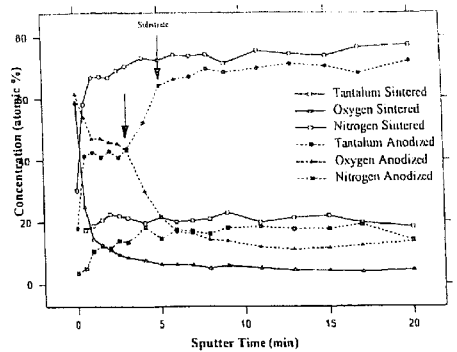

Figure 2 SAM depth profiles.

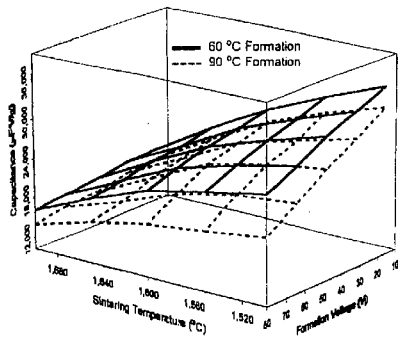

Figure 3 Capacitance as a function of sintering temperature, formation temperature and formation voltage.

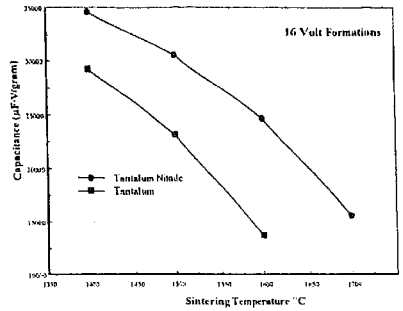

Figure 4 Capacitance as a function of sintering temperature for tantalum nitride and tantalum substrate capacitors.

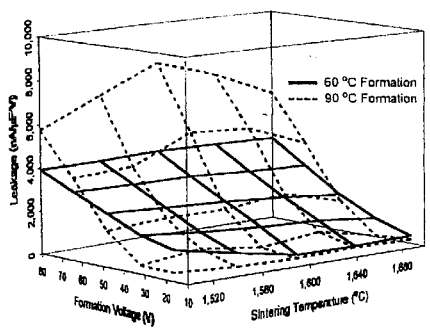

Figure 5 Leakage as a function of sintering temperature, formation temperature and formation voltage.

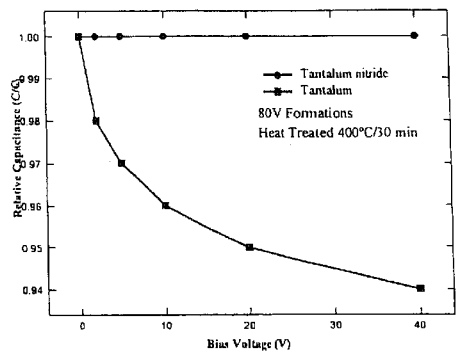

Figure 6 The bias dependence of capacitance of tantalum nitride and tantalum substrate capacitors.

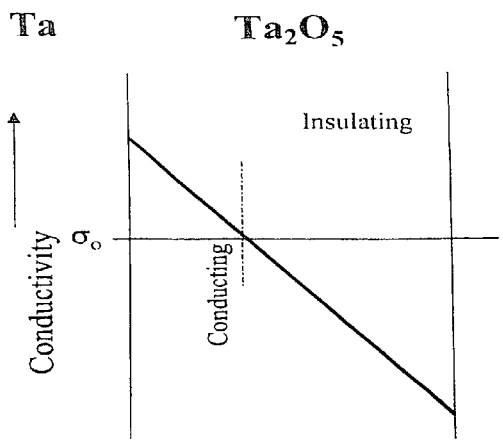
Figure 7 The conductivity profile.
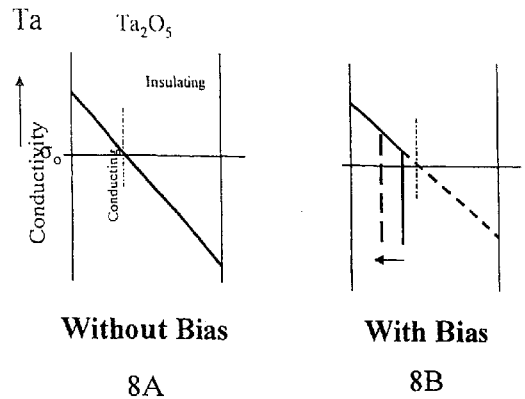
Figure 8 The effect of anodic bias on the conductivity profile.
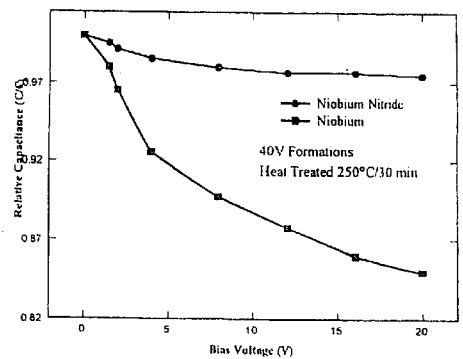
Figure 9 The bias dependence of capacitance of niobium nitride and niobium substrate capacitors.

CAPACITOR SUBSTRATES MADE OF REFRACTORY METAL NITRIDES

CROSS REFERENCE TO RELATED APPLICATIONS

This application claims priority of U.S. Provisional Application Ser. No. 60/119,010, filed Feb. 8, 1999 entitled TANTALUM NITRIDE (TAN) SUBSTRATES FOR SOLID CAPACITORS; U.S. Provisional Application Ser. No. 60/144,961, filed Jul. 21, 1999 entitled TA2N POWDER SUBSTRATES FOR ELECTROLYTIC CAPACITORS; U.S. Provisional Application Ser. No. 60/145,553, filed Jul. 23, 1999 entitled TA2N POWDER SUBSTRATES FOR ELECTROLYTIC CAPACITORS; U.S. Provisional Application Ser. No. 60/159,999, filed Oct. 18, 1999 entitled NIOBIUM NITRIDE POWDER SUBSTRATES FOR ELECTROLYTIC CAPACITORS; U.S. Provisional Application Ser. No. 60/159,998, filed Oct. 18, 1999 entitled TANTALUM NITRIDE POWDER SUBSTRATES FOR ELECTROLYTIC CAPACITORS and U.S. Provisional Application Ser. No. 60/171,835, filed Dec. 22, 1999 entitled TANTALUM NITRIDE: A NEW SUBSTRATES FOR SOLID ELECTROLYTIC CAPACITORS.

FIELD AND BACKGROUND OF THE INVENTION

The present invention relates to refractory metal nitride powders particularly those of Ta, Nb and more particularly to such powder as usable in solid electrolyte capacitors.

Solid tantalum capacitors are built on tantalum metal substrates with a dielectric layer composed of anodic tantalum oxide. A well-known problem with this structure is instability caused by oxygen migration from the oxide to the metal substrate during thermal cycling (ref. 1). A gradient of oxygen deficiency with an associated conductivity profile is created across the anodic oxide film.

The present invention focuses on capacitors using a porous mass of sintered nitrides (particularly TaN, $Ta_2N$, NbN) as the anode and nitride powders suitable for making them. The powders are referred to as "substrates" in relation to thin conversion "coatings" of dielectric oxide formed at the surfaces of the sintered powders of an anode slug (of various geometric forms) when contacted by a wet electrolyte under electro-formation conditions. In the final product the pores of the slug can be filled with a wet or solid electrolyte, but the invention is specially beneficially for solid electrolyte capacitors. Capacitors containing a conductivity profile have high bias, frequency and temperature dependence of capacitance. Although capacitor manufacturers have developed procedures to minimize or eliminate the oxygen deficiency and associated conductivity profile in the dielectric, the thermodynamic instability at the metal-metal oxide interface can contribute to ignition and other failures of solid electrolyte tantalum capacitors.

Work over the last 30 years (ref. 2 and references therein) has demonstrated that anodic oxide films grown on tantalum substrates doped with nitrogen are more stable to thermal cycling. If the nitrogen content in the tantalum exceeds 10 at, %; oxygen migration across the tantalum-tantalum oxide interface is suppressed. Capacitors made using a nitrogen doped tantalum substrate are significantly less sensitive to the effects of thermal cycling. In most cases, the substrates were thin films produced by sputtering tantalum in a nitrogen atmosphere. Sputtered substrate capacitors are found as micro devices in integrated circuits. The sputtered capacitors made using a $Ta_2N$ (33 at. % N) substrate were especially stable.

SUMMARY OF THE INVENTION

There is good potential for using TaN as the substrate for making a bilayer suitable for making a solid capacitor. The anodic film grown on this substrate is insensitive to the effects of heat treatment because the presence of nitrogen blocks the migration of oxygen across the substrate-anodic film interface. The experiments show solid capacitors made of powder with the TaN anodic film system can have negligible bias, frequency and temperature dependence of capacitance and be less susceptible to failure during long term aging. This was not made available to the art prior to the last 20 years (see Ref. 3 [copy appended] and references cited therein).

The use of nitrogen to improve the performance of tantalum capacitors made using tantalum as the substrate is known. U.S. Pat. No. 5,948,447, granted Sep. 5, 1995 to H. Chang/Cabot Corp., describes nitrogen doping (at levels of 500–7000 ppm) of tantalum or niobium powder substrates to reduce leakage and speculating a beneficial effect in limiting crystal growth during anodization and the benefit of higher solubility of nitrogen in tantalum or niobium (compared to oxygen) to lower leakage by limiting movement of oxygen and a synergistic effect of controlled combinations of nitrogen and oxygen content of the tantalum or niobium substrate. T. Tripp et al/H. C. Starck, Inc. in a symposium paper have described a 30 year long effort to investigate the effects of nitrogen doping on tantalum substrates, mostly as to sputter deposited layers of tantalum or tantalum nitride but including also nitrogen doped powder and describe current work that verifies the effect of nitrogen in retarding migration of oxygen across the metal (Ta or Nb)-anodic oxide interface. D. J. Werder et al/Bell Telephone Labs (Thin Solid Films 323 (1998): 6–9 provide transmission electron microscope images showing a tantalum pentoxide anodic film formed on a sputter deposited TaN substrate with nitrogen rich inclusions in the lower (toward the substrate) portion of the oxide layer that appear to be associated with a decrease of dielectric constant.

Most examples of this technique involve thin film nitrogen substrates prepared by sputtering tantalum in a nitrogen atmosphere. Niobium nitride powders are also disclosed for usage as substrates in electrolytic capacitors in the published PCT application WO 98/38660 (PCT/JP98/00823 filed Feb. 27, 1998 by K. Naito, Y. Uchida/Showa Denko KK), in an overall process and product system involving nitriding a niobium powder (made by chemical reduction of a niobium fluoride precursor) to produce niobium nitride powder, sintering the powder, oxidizing to form a niobium pentoxide layer (or forming such a layer in situ by a chemical vapor deposition process from an external precursor) as the dielectric, incorporating a variety of electrolytes in the pores of the sintered compact but preferably organic semiconductor systems and adding a cathode and packaging to define the complete electrolytic capacitor.

The invention also includes a niobium powder that is derived directly from a pure niobium pentoxide ($Nb_2O_5$), e.g. by reduction of the pentoxide with a magnesium vapor to form a niobium powder of extremely low oxygen impurity content and no pentoxide content at all, then introducing nitrogen in a reactor schedule that precludes re-oxidation of the niobium—the schedule having multiple stages of thermal processing and environmental control defined below to establish a niobium nitride powder compound without excess of nitrogen remaining and eventually cooling under inert atmosphere and air release of the powder to form only a limited oxide at room temperature.

Another objective is a substrate that provides for a more thermodynamically stable substrate-anodic film interface making the system less stable to the degradation that occurs in the niobium-niobium oxide system, (and even in the tantalum-tantalum oxide system) during thermal cycling.

Other objects, features and advantages of the invention will be apparent form the following description of preferred embodiments thereof, including illustrative non-limiting examples, of the practice of the process and the resulting products' configuration, composition and performance under test conditions.

BRIEF DESCRIPTION OF THE DRAWINGS

FIGS. 1–9 are graphs and profiles of test results and sample conditions as described in Example 7 below.

DETAILED DESCRIPTION OF PREFERRED EMBODIMENTS

A possible way of utilizing the ability of nitrogen to stabilize the anodic oxide films formed on Ta or Nb powders and use these to make discrete capacitors is to use a tantalum or niobium nitride ($Ta_2N$ [33 at. % N], TaN [50 at. % N] NbN [50 at. % N]) as the substrate. Those compounds can be pressed into pellets and processed using procedures similar to those in place for making solid tantalum capacitors and there is potential for making high reliability, solid capacitors with good volumetric efficiency using such nitrides.

Similar considerations apply to other refractory metal nitrides (Ti, Zr, Hf) and their uses as capacitors and other electrode forms and as catalysts, filters and for medical purposes.

EXAMPLES

The invention is now further disclosed with reference to the following non-limiting Examples.

Example 1

1A. Experimental Methods

Tantalum nitride was prepared by heating 2.3 Kg of tantalum powder in three temperature stages of 700 deg., 850 deg. and 1000 deg. C. The nitrogen was introduced in the form of $N_2$ gas mixed with argon. The initial gas mixture was 20-mole % nitrogen. At each temperature, the powder was stepwise exposed to higher nitrogen gas concentrations with a final exposure to pure nitrogen at 1000 deg. C. for 30 minutes. The resulting black powder was crushed and screened.

The starting material was primary powder taken from a sodium reduction run. The physical and chemical properties of this powder are listed in Table I, below, along with those of the tantalum nitride produced. The nitrogen concentration of 6.43 W/W % translates to a compound composition of $TaN_{0.90}$. (When the oxygen content is taken into account, the compound is $TaN_{0.9}O_{0.1}$.)

Pellets with a mass of 0.14 gm were pressed to a density of 5.5 g/cc and sintered at 1500 deg. C. and 1600 deg. C. for 20 minutes. The lead wire was tantalum. The pellets were anodized in 0.1 V/V % $H_3PO_4$ using a current density of 100 mA/gm and a hold time at the formation voltage of 2 hours. The formation temperatures were 25 deg., 60 deg., 80 deg., 90 deg., 95 deg. C. Formation voltages were 16 and 50 volts.

The capacitance was measured using a HP 4262A LCR bridge without or with applied anodic bias. The maximum bias voltage was 9 volts for the 16 V formations and 25 V for the 50 V formations. Anodized pellets were heat treated in air at 400 deg. C. for 30 minutes. Reformations were done in 0.1 V/V % $H_3PO_4$ held at the anodization temperatures. The reformation time was 2 hours.

1B. Results and Discussion

Table II, below, summarizes capacitance and leakage results as a function of formation voltage, formation temperature and pellet sintering temperature. Depending upon the conditions, the capacitance varied from a low of 23,000 to a high of 44,000 μFV/gm. The D.C. leakage (DCL) was high for pellets formed at 50 volts. Pellets formed to 16 volts at 90 deg. C. and 95 deg. C. had acceptably low leakages.

Table III, below, lists capacitances and leakages after heat treatment. With one exception, the capacitance dropped on average about 3%. This is in contrast to the behavior of the $Ta—Ta_2O_5$ system which undergoes a 7–12% increase in capacitance after heat treatment. The DCL was lower after the thermal cycle in most cases.

The heat-treated pellets anodized at 90 deg. C. were reformed at the formation voltage for two hours at the formation temperature. The capacitance and leakage results after reformation are summarized in Table IV. With one exception the capacitance relative to the original or heat-treated value decreased 2–3%. The leakages of all four sets of pellets were low and very low for the pellets sintered at 1600 deg. C. and formed to 16 volts. Clearly, the heat treatment/reformation process had a very positive impact on the electrical quality as measured by the DCL.

Table V, below, summarizes the bias dependence of capacitance (BDC) after the various treatments. The BDC was taken as the percent change in capacitance between the without bias value and the highest bias value. Of major significance, is the lack of a BDC after heat treatment. When the anodic film is grown on a tantalum substrate, there is a 5–10% bias dependence of capacitance after heat treatment at 400 deg. C. Of special interest is the fact that there was no BDC for the pellets that were reformed.

The lack of a bias dependence of capacitance after heat treatment is strong evidence that a conductive profile was not generated in the anodic film. This is expected if oxygen is not extracted from the anodic film by the substrate and is consistent with the numerous earlier observations that anodic oxide films grown on nitrogen doped substrates are resistant to oxygen migration across the metal-metal oxide interface (ref. 2). The ability of the TaN substrate to support a dielectric film that is resistant to the degrading effects of heat treatment can have a significant impact on the performance of solid capacitors made from this bi-layer system. The devices will have a low bias, frequency, and temperature dependence of capacitance and probably be more stable during accelerated life testing. This latter prediction is based on the fact that life test failures are known to occur because of dielectric breakdown associated with oxygen migration within and through the anodic oxide film. The more stable oxygen environment in anodic films grown are the TaN substrate will make the system less susceptible to the long term degradation mechanisms like ignition failures associated with oxygen migration.

References

1. Smyth, D. M. Shim, G. A., and Tripp, T. B, J. Electrochem. Soc., 110, 1264–71(1963).
2. Tripp, T. B., Shaw, M. D., and Cox, B, "The Effects of Nitrogen on the Properties of Anodic Oxide Films in Tantalum," Proceedings of CARTS 99, in press.
3. Werder. D. J., Kola, R. R. "Microstructure of $Ta_2O_5$ Films Grown by the Anodization of TaNx," 323 Thin Solid Films 6–9 (1998).

Example 2

Six pounds of experimental tantalum powder prepared by the reduction of $K_2TaF_7$ by Na in known manner,[1] was presintered at 1320° C. for 30 minutes and deoxidized at 1000° C. for two hours using 2 percent magnesium, in a known manner.[2]

[1]See, e.g., U.S. Pat. No. 2,950,185, Hellier et al., 1960.
[2]See, e.g., U.S. Pat. No. 4,537,641, Albrecht et al., 1985

Two pounds of such Ta powder were blended with 0.75% Mg and placed in a tantalum foil lined stainless steel boat. The powder was deoxidized at 950° C. for two hours. The deoxidation was carried out to remove any oxygen associated with the tantalum that could interfere with a subsequent nitriding process.

The boat containing such mixture was placed under a slightly greater than atmospheric argon pressure, and allowed to cool overnight. Next, the boat containing such mixture was heated to 680° C. as measured by a thermocouple suspended inside the furnace tube over the boat. The pressure was reduced to 600 mm Hg and nitrogen was introduced until the pressure was 760 mm Hg. The temperature was gradually increased and the pressure was maintained between 710 and 760 mm Hg by adding nitrogen as it was consumed by reaction with the tantalum. When the temperature reached 720° C., the pressure was reduced to 460 mm Hg and the system backfilled with nitrogen to 760 mm Hg. The temperature was increased gradually to 760° C. and the pressure maintained in the range of 710–760 mm Hg by adding nitrogen. The reaction was gentle as indicated by the slow rate of pressure drop. At this point, the pressure was reduced to 250 mm Hg and backfilled with nitrogen to 760 mm Hg. The reaction rate increased but still remained well controlled. The temperature was allowed to increase to 830° C. and the pressure was maintained at 710–760 mm Hg. Finally, the pressure was reduced to 0 mm Hg. The temperature was increased to give an inside temperature of 980° C. and the environment was maintained at this temperature and under a slight positive pressure of nitrogen for six hours.

After cooling to room temperature, the powder was passivated. The residual magnesium oxide and $Mg_3N_2$ were removed by leaching with dilute $H_2SO_4$ followed by rinsing to remove residual acid. The leached powder was dried at 60° C.

The powder was analyzed for nitrogen and oxygen. The nitrogen concentration was 38,600 ppm; this corresponds to the compound $Ta_2N$. The oxygen concentration was 1650 ppm. The powder was tested for electrical properties before and after heat treatment and after reformation following heat treatment. The heat treatment conditions were 400° C. for 30 minutes in air. The pellets were reformed at the formation voltage for 30 minutes. The pellet preparation, formation and testing conditions are summarized in Table VI, below. Four pellet sets corresponding to the three sintering temperatures were formed together for each combination of formation voltage and formation temperature. In general, the anodization process went smoothly under all conditions of sintering temperature, formation voltage and formation temperature.

Several four-volt, 225 $\mu F$ solid capacitors were made using known process condition developed for 30–50,000 CV/gm tantalum capacitors. The powder was pressed at 4.5 $gm/cm^3$ and sintered at 1600° C. for twenty minutes. The pellet mass was 0.14 gm. No difficulties were encountered in processing. The capacitors were tested as shown in Table I. None of the finished capacitors failed. The accelerated aging was carried out at 85° C. for 240 hours with an applied voltage of 6.1V. All of the capacitors survived the life testing.

The four pellet averaged capacitance values as a function of sintering temperature, formation voltage and formation temperature after formation, after heat treatment and after reformation are summarized in Table VII, below. The capacitance ranged from a high of 38,000 CV/gm at the 1400°/60°/16V condition to a low of 18,500 CV/gm at the 1600°/90°/80V condition. The capacitance dropped from 2 to 7 percent after heat treatment depending upon the formation voltage. The capacitance drop was highest for the pellets formed to 16V. In general, the capacitance drop was higher for the pellets formed at 90° C. relative to those formed at 60° C. There was little further change in capacitance after the pellets were reformed.

The four pellet averaged leakages are collected in Table VIII, below. They ranged from a high of about 5.72 nA/$\mu F \cdot V$ to a low of 0.36 na/$\mu F \cdot V$ after formation and 7.5 to 0.16 nA/$\mu F \cdot V$ after reformation. In general, the pellets formed at 90° C. had lower leakage than those formed at 60° C. The leakage increased significantly after heat treatment but in each case returned to a value close to the after-formation value for the pellet when the pellets were anodically reformed.

The bias dependence of capacitance after formation, heat treatment and reformation are given in Table IX, below. The bias dependence was calculated as the percent change in capacitance with an applied bias of 50 percent of the formation voltage relative to the capacitance without bias. When the substrate is tantalum, the capacitor has a negative bias dependence of capacitance of 8–10 percent after heat treatment. In the present case ($Ta_2N$ substrate), there was no bias dependence (or at most a small positive bias dependence) of capacitance after heat treatment. This is strong evidence that a conductivity profile associated with an oxygen deficiency profile does not exist in the anodic film. This property can considerably simplify the process for making solid capacitors and should give devices that are more stable under high thermal stress conditions.

Table X, below summarizes the results for solid capacitance. It was possible to make very good 4 volt solid capacitors from the powder. The devices performed well during accelerated life testing.

TABLE I

Summary of Physical and Chemical Properties

| Property | KF70-59 | TaN |
|---|---|---|
| FAPD ($\mu$) | 0.50 | 0.70 |
| Bulk Density (g/in$^3$) | 13.1 | 14.3 |
| Bulk Density (g/cc) | 0.79 | 0.86 |
| Surface Area (cm$^2$/gm) | 20,300 | 18,600 |
| Oxygen | 7250 | 8970 |
| Nitrogen | 1010 | 6.43% |
| Carbon | 29 | 69 |
| Sulfur | 31 | 21 |
| Chromium | 6 | 9 |
| Iron | 22 | <5 |
| Nickel | 21 | <5 |
| Potassium | 25 | <10 |
| Sodium | 2 | <1 |

TABLE II

Summary of Capacitance and Leakage Results (After Formation)

| Formation Temperature | Sintering Temperature | Formation Voltage | Capacitance ($\mu F \cdot V$/gm) | Leakage nA/$\mu F \cdot V$ |
|---|---|---|---|---|
| 25 | 1500 | 50 | 44,000 | 23.4 |
| 60 | 1500 | 50 | 31,300 | 47.9 |
| 80 | 1500 | 50 | 32,500 | 25.7 |
| 90 | 1500 | 16 | 40,000 | 1.6 |
| 90 | 1500 | 50 | 31,500 | 9.2 |

TABLE II-continued

Summary of Capacitance and Leakage Results
(After Formation)

| Formation Temperature | Sintering Temperature | Formation Voltage | Capacitance ($\mu F \cdot V/gm$) | Leakage $nA/\mu F \cdot V$ |
|---|---|---|---|---|
| 90 | 1600 | 16 | 26,800 | 0.77 |
| 90 | 1600 | 50 | 23,000 | 37.6 |
| 95 | 1600 | 16 | 25,800 | 0.69 |
| 95 | 1600 | 50 | 23,000 | 21.8 |

TABLE III

Summary of Capacitance and Leakage Results
(After Heat Treatment)

| Formation Temperature | Sintering Temperature | Formation Voltage | Capacitance $\mu F \cdot V/gm$ | Leakage $nA/\mu F \cdot V$ |
|---|---|---|---|---|
| 25 | 1500 | 50 | 41,400 | |
| 60 | 1500 | 50 | 35,300 | |
| 80 | 1500 | 50 | 31,600 | 20.5 |
| 90 | 1500 | 16 | 40,000 | 11.0 |
| 90 | 1500 | 50 | 29,800 | 13.0 |
| 90 | 1600 | 16 | 25,800 | 6.2 |
| 90 | 1600 | 50 | 22,600 | 26.6 |
| 95 | 1600 | 16 | 25,400 | |
| 95 | 1600 | 50 | 22,600 | |

TABLE IV

Summary of Capacitance and Leakage Results
(After Reformation)

| Formation Temperature | Sintering Temperature | Formation Voltage | Capacitance ($\mu F \cdot V/gm$) | Leakage ($nA/\mu F \cdot V$) |
|---|---|---|---|---|
| 90 | 1500 | 16 | 39,000 | 0.80 |
| 90 | 1500 | 50 | 30,300 | 0.92 |
| 90 | 1600 | 16 | 25,800 | 0.49 |
| 90 | 1600 | 50 | 22,000 | 1.5 |

TABLE V

Summary of Bias Dependence of Capacitance Results

| Formation Temperature | Sintering Temperature | Formation Voltage | Bias Dependence of Capacitance (%) | | |
|---|---|---|---|---|---|
| | | | After Formation | After Heat Treatment | After Reformation |
| 25 | 1500 | 50 | 1.5 | 1.0 | |
| 60 | 1500 | 50 | 0.0 | 1.5 | |
| 80 | 1500 | 50 | 0.34 | 0.1 | |
| 90 | 1500 | 16 | 1.7 | 1.1 | 0.0 |
| 90 | 1500 | 50 | 0.3 | 0.0 | 0.0 |
| 90 | 1600 | 16 | 1.7 | 0.9 | 0.0 |
| 90 | 1600 | 50 | 1.2 | 1.8 | 0.0 |
| 95 | 1600 | 16 | 1.8 | 0.0 | |
| 95 | 1600 | 50 | 0.0 | 1.2 | |

TABLE VI

Summary of Pellet Preparation, Formation and Testing Conditions

| Condition | Value(s) |
|---|---|
| Pellet Mass | 0.14 gm |
| Press Density | 5.0 g/cm$^3$ |
| Sintering Temperature | 1400°, 1500°, 1600° C. |
| Sintering Time | 20 minutes |
| Formation Temperature | 60° C., 90° C. |
| Formation Voltage | 16, 40, 80 V |
| Formation Current | 100 mA/gm |
| Hold Time | 2 hours |
| Formation Electrolyte | 0.1 V/V % $HD_3PO_4$ |
| DCL Test Voltage | 70% $V_f$ |
| DCLL Soak Time | 5 minutes |
| Maximum Bias Voltage | 50% $V_f$ |

TABLE VII

Summary of Capacitance Results
($\mu F \cdot V \cdot gram$)

| Form. Voltage | Sintering Temperature | | | | | | | | |
|---|---|---|---|---|---|---|---|---|---|
| | 1400 | | | 1500 | | | 1600 | | |
| | AF | AHT | AR | AF | AHT | AR | AF | AHT | AR |
| | | | | 60° C. Formation | | | | | |
| 16 | 38,000 | 35,700 | 35,500 | 35,000 | 32,900 | 33,300 | 27,300 | 25,500 | 25,400 |
| 40 | 34,700 | 33,500 | 36,300 | 31,700 | 30,700 | 33,600 | 25,800 | 24,900 | 27,000 |
| 80 | 27,900 | 27,400 | 27,200 | 26,400 | 25,600 | 25,500 | 21,500 | 21,500 | 21,400 |
| | | | | 90° C. Formation | | | | | |
| 16 | 34,200 | 31,300 | 23,200 | 31,700 | 29,300 | 32,600 | 25,000 | 23,300 | 24,400 |
| 40 | 32,200 | 30,000 | 22,500 | 29,200 | 28,300 | 25,300 | 23,300 | 22,600 | 22,600 |
| 80 | 34,600 | 30,200 | 22,500 | 19,900 | 19,800 | 20,100 | 18,900 | 18,600 | 18,500 |

*AF = After Formation
AHT = After Heat Treatment
AR = After Reformation

TABLE VIII

Summary of Leakage Results
(nA/μF · V)

| Form. Voltage | Sintering Temperature | | | | | | | | |
|---|---|---|---|---|---|---|---|---|---|
| | 1400 | | | 1500 | | | 1600 | | |
| | AF | AHT | AR | AF | AHT | AR | AF | AHT | AR |
| 60° C. Formation | | | | | | | | | |
| 16 | 0.92 | 10.71 | 0.57 | 0.83 | 4.02 | 0.73 | 0.36 | 1.02 | 0.47 |
| 40 | 2.91 | 2.33 | 1.48 | 2.94 | 2.37 | 2.77 | 0.76 | 1.82 | 1.59 |
| 80 | 2.76 | 4.44 | 3.41 | 3.63 | 9.20 | 7.50 | 2.71 | 8.61 | 6.10 |
| 90° C. Formation | | | | | | | | | |
| 16 | 0.57 | 3.05 | 0.27 | 0.36 | 1.23 | 0.24 | 0.13 | 0.73 | 0.16 |
| 40 | 0.75 | 1.55 | 0.38 | 1.44 | 2.97 | 0.63 | 0.47 | 2.09 | 0.43 |
| 80 | 2.21 | 4.69 | 0.77 | 5.72 | 11.37 | 1.83 | 3.49 | 9.93 | 1.09 |

*AF = After Formation
AHT = After Heat Treatment
AR = After Reformation

TABLE IX

Summary of Bias Dependence of Capacitance Results
(Percent)

| Form. Voltage | Sintering Temperature | | | | | | | | |
|---|---|---|---|---|---|---|---|---|---|
| | 1400 | | | 1500 | | | 1600 | | |
| | AF | AHT | AR | AF | AHT | AR | AF | AHT | AR |
| 60° C. Formation | | | | | | | | | |
| 16 | −0.71 | 4.70 | 3.29 | 0.54 | 2.60 | 4.02 | −1.01 | 1.71 | 1.10 |
| 40 | 0.79 | 0.00 | −0.34 | 0.57 | −0.05 | −0.41 | −0.43 | 0.01 | −0.83 |
| 80 | 0.78 | 1.09 | 0.97 | 0.88 | 1.25 | 0.87 | 0.28 | 1.03 | 0.83 |
| 90° C. Formation | | | | | | | | | |
| 16 | −1.22 | 4.01 | 2.47 | −0.60 | 3.90 | 3.79 | 2.47 | 3.79 | 1.54 |
| 40 | 0.38 | −0.10 | 1.260 | 0.36 | −0.40 | 1.41 | −0.42 | −0.02 | 0.94 |
| 80 | −0.66 | 1.57 | 1.34 | −0.57 | 0.70 | 0.78 | −0.57 | 1.24 | 0.98 |

*AF = After Formation
AHT = After Heat Treatment
AR = After Reformation

TABLE X

Summary of Solid Capacitor Results

| Wet DCL | Wet Cap (na/μF · V) | Solid DCL μF · V/gram | Solid Cap (na/μF · V) | Cap Rec | Yield |
|---|---|---|---|---|---|
| 0.205 | 26,200 | 0.310 | 22,310 | 85% | 100% |

| Life Test DCL (nA/μF · V) | | | | | |
|---|---|---|---|---|---|
| 0 Hours @ 6.1 V | | 240 hours @ 6.1 V | | | |
| 25° | 85° | 85° C. | 25° C. | Yield | # Shorts |
| 0.310 | 2.249 | 2.105 | 0.279 | 100% | 0 |

Example 3

Niobium powder was made by reducing $Nb_2O_5$ with magnesium. The resulting powder's properties are summarized in Table XI.

TABLE XI

| Property | Value |
|---|---|
| Fisher Avg. Part. Diam., FAPD (μ) | 1.4 |
| Scott Bulk Dens., SBD (g/in$^3$) | 16.2 |
| Surface Area (cm$^2$/g) | 2.3 |
| Carbon | 154 |
| Chromium | 34 |
| Iron | 47 |
| Nickel | 74 |
| Nitrogen | 2880 |
| Oxygen | 9900 |
| Silicon | 30 |
| Sulfur | 13 |

One kilogram of the powder was blended with 22 gm of magnesium and placed in a niobium foil lined stainless steel tray. The tray and its contents were put in a laboratory tube furnace. The tube was flushed with argon. The temperature of the furnace was raised to 950° C. and the system maintained at this temperature for 2 hours under an argon atmosphere to deoxidize the powder. The furnace was allowed to cool overnight while maintaining a slight argon flow through the tube. Next, the temperature was increased to 680° C. as measured with a thermocouple inside the tube suspended over the sample and the pressure was reduced to 610 mm Hg. Using nitrogen, the pressure was increased to 760 mm Hg. Over the next thirty minutes, the temperature was increased to approximately 750° and the pressure was maintained between 660 and 760 mm Hg by adding nitrogen gas to replace the nitrogen consumed in the reactor. At this point, the pressure was reduced to 460 mm Hg and then increased to 760 mm Hg using nitrogen. A significant increase in the reaction rate occurred as indicated by the rate of pressure drop and an increase in the temperature. One hour after the start of the process, the temperature had reached 900° C. and the reaction was proceeding at a moderate rate as indicated by the rate of pressure decrease. The pressure was reduced to 250 mm Hg and then the system was returned to 760 mm Hg with nitrogen. A rapid pressure drop followed and a temperature increase occurred. The pressure was maintained at 760 mm Hg using nitrogen additions for the next 15 minutes as the temperature increased to 960° C. Following complete evacuation of the tube, nitrogen was added to bring the pressure to 760 mm Hg. Very little pressure drop followed indicating the reaction was essentially complete. Finally, the pressure was increased to 810 mm Hg and the system was maintained at 1000° for six hours.

After cooling to room temperature, the powder was passivated by controlled exposure to aid. The powder was then leached with dilute sulfuric acid to remove MgO, $Mg_2N_3$ and residual Mg, and then with high purity water to remove traces of acid. The oxygen and nitrogen content of the powder were measured using a LECO 436-oxygen/nitrogen analyzer. The nitrogen concentration was 151,000 ppm corresponding to the compound NbN without excess nitrogen. The oxygen content was 4300 ppm.

The powder was fabricated to anodes, anodized and tested in a wet electrolyte for electrical properties before and after heat treatment and after reformation at the formation voltage for 30 minutes. The pellet preparation, formation, and testing conditions are summarized in Table XII.

TABLE XII

| Condition | Value(s) |
|---|---|
| Pellet Mass | 0.14 gm |
| Press Density 3.5 g/cm³ | |
| Sintering Temperature(s) | 1500°, 1600°, 1700° C. |
| Sintering Time | 20 minutes |
| Formation Temperature(s) | 60° C., 90° C. |
| Formation Voltage(s) Vf | 16, 40 |
| Formation Current | 100 mA/gm |
| Hold Time | 2 hours |
| Formation Electrolyte | 0.1 V/V % $H_3PO_4$ |
| DCL Test Voltage | 70% $V_f$ |
| DCL Soak Time | 5 minutes |
| Maxim. Bias Voltage | 50% $V_f$ |

The pellets were heat-treated in air for 30 minutes at 400° C. Four pellet sets corresponding to the three sintering temperatures were formed together for each combination of formation voltage and formation temperature. It was not possible to anodize pellets sintered at 1400° C. and pellets could not be anodized to 80 volts at any of the sintering temperatures The four pellet averaged capacitance values (in $\mu F \cdot V$/gram) as a function of pellet sintering temperature, formation voltage and formation temperature, after the steps of formation (AF), heat treatment (AHT) and reformation (AR) are given in Table XIII.

TABLE XIII

| | Sintering Temperature (° C.) | | | | | | | | |
|---|---|---|---|---|---|---|---|---|---|
| Form'n | 1500 | | | 1600 | | | 1700 | | |
| Voltage | AF | AHT | AR | AF | AHT | AR | AF | AHT | AR |
| | 60° Formation | | | | | | | | |
| 16 | 41,000 | 38,600 | 37,900 | 37,700 | 35,800 | 35,400 | 26,400 | 25,000 | 24,700 |
| 40 | 40,900 | 40,700 | 38,600 | 37,400 | 36,300 | 35,800 | 26,800 | 26,700 | 25,600 |
| | 90° Formation | | | | | | | | |
| 16 | 37,000 | 32,100 | 30,300 | 34,400 | 30,400 | 29,200 | 24,800 | 21,000 | 19,300 |
| 40 | 41,700 | 35,900 | 36,800 | 39,400 | 32,900 | 33,200 | 28,000 | 24,400 | 24,100 |

The capacitance ranged from a low 19,300 $\mu F \cdot V$/gm at the 1700°/90°/16V condition and a high 41,700 $\mu F \cdot V$/gm at the 1500°/90°/40V condition. There was an increase in capacitance when the formation voltage was increased from 16 to 40V. A similar behavior occurs with niobium when the anodization voltage increases. This is contrary to the behavior of anodes made with Ta substrates where capacitance decreases as the formation voltage increases. The capacitance decreased from 0.5 to 16% after heat treatment depending upon the formation voltage and formation temperature. The capacitance change was higher for the pellets anodized at 90° C.

The leakage results (in nA/$\mu F \cdot V$) are summarized in Table XIV.

TABLE XIV

| | Sintering Temperature | | | | | | | | |
|---|---|---|---|---|---|---|---|---|---|
| Form'n | 1500 | | | 1600 | | | 1700 | | |
| Voltage | AF | AHT | AR | AF | AHT | AR | AF | AHT | AR |
| | 60° Formation | | | | | | | | |
| 16 | 0.60 | 1.31 | 0.58 | 0.29 | 0.50 | 0.26 | 0.24 | 0.65 | 0.27 |
| 40 | 0.20 | 1.06 | 0.25 | 0.12 | 0.77 | 0.14 | 0.08 | 0.36 | 0.12 |
| | 90° Formation | | | | | | | | |
| 16 | 0.93 | 2.75 | 0.93 | 0.46 | 1.06 | 0.50 | 0.59 | 0.63 | 0.22 |
| 40 | 0.27 | 1.75 | 0.42 | 0.09 | 0.57 | 0.09 | 0.07 | 0.48 | 0.12 |

The highest leakage after formation was 0.60 nA/$\mu F \cdot V$ and the lowest was 0.09 nA/$\mu F \cdot V$. In general, the heat treatment/reformation process lowered the leakage. Overall, pellets with the lowest leakages were anodized at 60° C. to 40 volts.

Table XV, below, shows (as a %) the bias dependence of capacitance as a function of sintering temperature, formation voltage, and formation temperature.

TABLE XV

| | Sintering Temperature | | | | | | | | |
|---|---|---|---|---|---|---|---|---|---|
| Form'n | 1500 | | | 1600 | | | 1700 | | |
| Voltage | AF | AHT | AR | AF | AHT | AR | AF | AHT | AR |
| | 60° Formation | | | | | | | | |
| 16 | −0.96 | −0.11 | −0.20 | −1.07 | −0.14 | −0.20 | −2.06 | −0.44 | −0.22 |
| 40 | −2.34 | −0.11 | −0.28 | −3.37 | −0.10 | −0.25 | −8.61 | −0.41 | −0.31 |

TABLE XV-continued

| | Sintering Temperature | | | | | | | | |
|---|---|---|---|---|---|---|---|---|---|
| Form'n | 1500 | | | 1600 | | | 1700 | | |
| Voltage | AF | AHT | AR | AF | AHT | AR | AF | AHT | AR |
| 90° Formation | | | | | | | | | |
| 16 | −6.80 | −4.56 | −0.28 | −6.43 | −1.79 | −0.17 | −5.42 | −3.52 | −0.35 |
| 40 | −14.0 | −2.70 | −6.03 | −16.3 | −0.76 | −4.11 | −15.2 | −0.79 | −3.15 |

The after formation pellets had a relatively large bias dependence of capacitance at the 90°/40V condition. This bias dependence occurs with the application of a small (~1.5V) bias and little additional bias dependence occurs as the applied bias increases. This is similar to the behavior for anodized niobium. In general, the bias dependence of capacitance was low after the pellets were heat-treated. Interestingly, the high bias dependence after anodization disappears after heat treatment. The insensitivity of the system to heat treatment is striking given the fact that the anodic oxide film on niobium is severely damaged when exposed to temperatures in the 170° C. range. The lack of a bias dependence of capacitance after heat treatment is consistent with a model that the niobium nitride/anodic oxide film interface is more stable than the niobium metal/anodic oxide film interface.

The foregoing example with included discussion/analysis shows that it is possible to provide a niobium nitride powder and an anodized sintered pellet form thereof to serve as an anode basis for capacitors with low D.C. leakage and comply with the necessary criteria of stability, reliability, cost, capacitance and ultimately fill the long extant gap between aluminum and tantalum and to some degree surpass tantalum systems. The new niobium nitride based system is suitable for solid capacitors.

Example 4

A similar series of powder preparation and capacitor steps, as in Example 3, was carried out (with the added step of solid electrolyte impregnation and conventional cathode application) to produce twenty 4-volt solid electrolyte capacitor powders each comprising a sintered porous (pores filled with manganese dioxide electrolyte made by thermal decomposition of manganese nitrate) anode of niobium nitride powders with anodic film as the dielectric. The anodes were made up as pressed 3.5 gm blocks and sintered at 1700 deg. C. before oxidation (formation), impregnation and completion of capacitor processing. Tests of capacitance and leakage were conducted under wet and solid electrolyte environments, noting solid electrolyte presence capacitance as a percentage of wet electrolyte presence capacitance (capacitance recovery, Cap. Rec.). Wet and solid D.C. leakage were also measured. The average of twenty 4 volt capacitors was 26,400 CV/gm wet capacitance, 24,100 dry, i.e. capacitance recovery of 91.5% D.C. leakage was 0.24 nA/$\mu$F·V wet and 0.85 nA/$\mu$F·V solid. A 100% yield was obtained in the processing and test of the group of twenty. The solid electrolyte samples were life tested through an aging period of 40 hours.

Initially (at essentially 0 time elapsed) the average of leakage was 0.85 nA/$\mu$F·V at 25 deg. C. and 6.63 nA/$\mu$F·V at 85 deg. C. After 40 hours of aging at 85 deg. C. with an applied bias of 0.1 volts, the average of leakage at 85° C. was 5.93 nA/$\mu$F·V and at 85 deg. C. the average of leakage was 0.81 nA/$\mu$F·V. There were no shorts, voltage breakdown, ignition or other runaway conditions among the 20 capacitors. All the 25 deg. C. items were below the established threshold of the industry of 2.5 nA/$\mu$F·V, but high compared to TaN systems (studied separately and described in another co-pending provisional patent application), those skilled in the art will recognize that the leakage level can be substantially reduced for NbN systems by further optimization of powder morphology, as well as sinter, formation and electrolyte impregnation conditions.

The results demonstrate an improved process for making niobium nitride (NbN) by removing the oxygen in the niobium feedstock by magnesium deoxidation prior to nitriding. The nitride can be used as the substrate for making solid electrolyte capacitors with electrical quality comparable to that of devices made using tantalum as the substrate. The niobium nitride-anodic film interface is thermodynamically more stable than the niobium-anodic niobium oxide interface (and compares well vs. a tantalum-anodic tantalum oxide interface) as evidenced by the lack of a bias dependence of capacitance after heat treatment for the niobium nitride substrate system.

Example 5

Tantalum powder was made by conventional sodium reduction of a potassium fluotantalate precursor and powder leaching and sizing. The powder was presintered at 1320° for 30 minutes and deoxidized using magnesium to remove the excess oxygen introduced during agglomeration. The resulting powder's properties are summarized in Table XVI.

TABLE XVI

| Property | Value |
|---|---|
| Fisher Avg. Part. Dia., FAPD ($\mu$) | 2.0 |
| Flow (Sec) | 0.34 |
| Surface Area (cm$^2$/g) | 13,700 |
| Scott Bulk Dens., SBD (gm/in$^3$) | 25.5 |
| Carbon | 34 |
| Calcium | 2 |
| Chromium | 9 |
| Copper | 1 |
| Iron | 5 |
| Potassium | 13 |
| Nitrogen | 1,840 |
| Sodium | 1 |
| Nickel | 11 |
| Oxygen | 4,130 |
| Sulfur | 10 |
| Silicon | 8 |

Approximately one kg of this powder was blended with 0.75 W/W % Mg and placed in the R&D tube furnace in a tantalum lined stainless steel tray. The furnace tube was evacuated, back-filled with argon and heated to 1000° C. This temperature was maintained for two hours to deoxidize the powder. The furnace was allowed to cool overnight.

The temperature was increased to 680° C. as measured with a thermocouple inside the tube and suspended over the powder. The pressure in the tube was reduced to 610 mm Hg and the system back-filled with nitrogen until the pressure returned to atmospheric (760 mm Hg). Additional nitrogen was added to maintain an approximate atmospheric pressure as the nitrogen was consumed by reaction with the tantalum. Twenty minutes into the process, the pressure was reduced to 460 mm Hg and then increased to 760 mm Hg with nitrogen. At this point, the temperature was 710° C. Again, the pressure was maintained at near atmospheric with nitrogen additions as the temperature was increased over the next 25 minutes to 850° C. The pressure was reduced to 250 mm Hg and increased back to 760 mm Hg with nitrogen. While maintaining near atmospheric pressure in the tube using nitrogen additions, the temperature was increased to 1030° over a period of 50 minutes. The pressure was then reduced to ~0 mm Hg and the system filled with nitrogen to 810 mm Hg. The system was maintained at this temperature and pressure for five hours.

The furnace was allowed to cool to room temperature and the powder was passivated using the high capacitance powder passivation cycle. The powder was leached with dilute $H_2SO_4$ solution to remove the MgO, $Mg_2N_3$ and any residual Mg. The residues of acid were removed by rinsing with high purity water. The powder was dried to 60° C.

The powder was analyzed for oxygen and nitrogen using a Leco 436 oxygen/nitrogen analyzer. The oxygen concentration was 2840 ppm and the nitrogen content was 6.99% W/W % (75,200 ppm). This corresponds to the compound $TaN_{0.97}$.

The powders were tested for electrical properties before and after heat treatment and after reformation following heat treatment. The heat treatment conditions were 400° C. for 30 minutes in air. The pellets were reformed at the formation voltage for 30 minutes. The pellet preparation, formation and testing conditions are summarized in Table XVII.

TABLE XVII

| Condition | Value(s) |
| --- | --- |
| Pellet Mass | 0.14 gm |
| Press Density | 5.0 g/cm$^3$ |
| Sintering Temperature | 1500°, 1600°, 1700° C. |
| Sintering Time | 20 minutes |
| Formation Temperature | 60° C., 90° C. |
| Formation Voltage | 16, 40, 80 |
| Formation Current | 100 mA/gm |
| Hold Time | 2 hours |
| Formation Electrolyte | 0.1 V/V % $H_3PO_4$ |
| DCL Test Voltage | 70% $V_f$ |
| DCL Soak Time | 5 minutes |
| Maxim. Bias Voltage | 50% $V_f$ |

Four pellet sets corresponding to the three sintering temperatures were formed together for each combination of formation voltage and formation temperature. In general, the anodization process went smoothly under all conditions of sintering temperature, formation voltage and formation temperature. The four pellet averaged capacitance values (in $\mu F \cdot V$/gram) as a function of pellet sintering temperature, formation voltage and formation temperature, after the steps of formation (AF), heat treatment (AHT) and reformation (AR) are Even in Table XVII.

TABLE XVIII

| | Sintering Temperature (° C.) | | | | | | | | |
| --- | --- | --- | --- | --- | --- | --- | --- | --- | --- |
| Form'n | 1500 | | | 1600 | | | 1700 | | |
| Voltage | AF | AHT | AR | AF | AHT | AR | AF | AHT | AR |
| | | | | 60° Formation | | | | | |
| 16 | 35600 | 33300 | 32900 | 28300 | 26500 | 26400 | 18100 | 17000 | 16800 |
| 40 | 32600 | 31800 | 31900 | 26600 | 26300 | 26100 | 17600 | 17400 | 17400 |
| 80 | 26700 | 26900 | 26300 | 23000 | 22900 | 22500 | 15900 | 15900 | 15800 |
| | | | | 90° Formation | | | | | |
| 16 | 32500 | 30800 | 30500 | 26300 | 24900 | 24700 | 16600 | 15700 | 15600 |
| 40 | 28100 | 28100 | 27900 | 24200 | 23800 | 23800 | 15700 | 15600 | 15700 |
| 80 | 20400 | 19300 | 15600 | 18000 | 17300 | 133300 | 13800 | 13600 | 13500 |

The capacitance ranged from a high of 35,600 $\mu F \cdot V$/gm at the 16V/60°/1500° condition to a low of 13,800 $\mu F \cdot V$/gm at the 80V/90°/1700° condition. As with $Ta_2N$ and NbN substrate capacitors, the capacitance decreases after heat treatment and after reformation.

The leakage results (in nA/$\mu F \cdot V$) are summarized in Table IXX.

TABLE IXX

| | Sintering Temperature | | | | | | | | |
| --- | --- | --- | --- | --- | --- | --- | --- | --- | --- |
| Form'n | 1500 | | | 1600 | | | 1700 | | |
| Voltage | AF | AHT | AR | AF | AHT | AR | AF | AHT | AR |
| | | | | 60° Formation | | | | | |
| 16 | 1.40 | 9.89 | 2.25 | 0.33 | 0.54 | 0.31 | 0.31 | 0.70 | 0.28 |
| 40 | 2.06 | 3.79 | 1.09 | 1.72 | 2.11 | 0.63 | 1.23 | 2.89 | 0.67 |
| 80 | 3.92 | 3.55 | 3.41 | 4.00 | 3.38 | 3.39 | 3.89 | 3.70 | 3.42 |
| | | | | 90° Formation | | | | | |
| 16 | 0.39 | 6.17 | 0.42 | 0.16 | 0.36 | 0.12 | 0.18 | 0.55 | 0.16 |
| 40 | 0.80 | 1.92 | 0.28 | 0.79 | 1.59 | 0.71 | 0.46 | 1.61 | 0.17 |
| 80 | 5.72 | 12.87 | 4.84 | 8.15 | 13.47 | 6.21 | 6.07 | 13.73 | 5.07 |

The leakages increased as the formation voltage increased and the sintering temperature decreased. At the 16V and 40V formation conditions, the leakage decreased as the formation temperature increased. The reverse occurred at the 80V condition. In general, the leakages were lowest after reformation. The leakages for the TaN/anodic film capacitors are higher than the ones for $Ta_2N$/anodic film capacitors and NbN/anodic film capacitors (production and testing described in separate co-pending provisional applications) at the 16V and 40V conditions. Except at the highest formation voltages, the leakages were in most cases acceptably low.

Table XXV, below, shows (as a %) the bias dependence of capacitance as a function of sintering temperature, formation voltage, and formation temperature.

TABLE XXV

| Form. Voltage | Sintering Temperature | | | | | | | | |
|---|---|---|---|---|---|---|---|---|---|
| | 1500 | | | 1600 | | | 1700 | | |
| | AF | AHT | AR | AF | AHT | AR | AF | AHT | AR |
| 60° Formation | | | | | | | | | |
| 16 | −0.31 | −0.05 | −0.01 | −0.29 | −0.04 | −0.09 | −0.41 | −0.04 | −0.12 |
| 40 | −0.18 | −0.10 | −0.07 | −0.20 | −0.09 | −0.07 | −0.19 | −0.11 | −0.05 |
| 80 | −0.10 | −0.10 | −0.11 | −0.12 | −0.12 | −0.13 | −0.11 | −0.10 | −0.11 |
| 90° Formation | | | | | | | | | |
| 16 | −0.32 | −0.05 | −0.02 | −0.32 | 0.00 | 0.08 | −0.38 | −0.08 | 0.09 |
| 40 | −0.16 | −0.08 | −0.08 | −0.19 | −0.08 | −0.09 | −0.15 | −0.08 | −0.07 |
| 80 | −0.10 | −0.11 | −0.06 | −0.10 | −0.11 | −0.07 | −0.10 | −0.06 | −0.05 |

It is seen that the tantalum nitride/anodic film system is very insensitive to heat treatment. TaN is better than Ta2N and NbN in resisting the effects of heat treatment.

The foregoing example with included discussion/analysis shows that it is possible to provide a tantalum nitride powder and an anodized sintered pellet form thereof to serve as an anode basis for capacitors with low D.C. leakage and comply with the necessary criteria of stability, reliability, cost, and capacitance. The system is suitable for solid capacitors.

Example 6

A similar series of powder preparation and capacitor steps, as in Example 1, was carried out (with the added step of solid electrolyte impregnation and conventional cathode application) to produce twenty 4-volt solid electrolyte capacitor powders each comprising a sintered porous (pores filled with manganese dioxide electrolyte made by thermal decomposition of manganese nitrate) anode of niobium nitride powders with niobium pentoxide as the dielectric. The anodes were made up as pressed 5.5 gm. blocks and sintered at 1600 deg. C. before oxidation (formation), impregnation and completion of capacitor processing. Tests of capacitance and leakage were conducted under wet and solid electrolyte environments, noting solid electrolyte presence capacitance as a percentage of wet electrolyte presence capacitance (capacitance recovery, Cap. Rec.). Wet and solid D.C. leakage were also measured. The average of twenty 4-volt capacitors was 27,500 CV/gm wet capacitance, 24,600 dry, i.e. capacitance recovery of 89.6%. D.C. leakage was 0.26 nA/$\mu$F·V wet and 0.14 nA/$\mu$F·V solid. A 100% yield was obtained in the processing and test of the group of twenty. The solid electrolyte samples were life tested through an aging period of 40 hours.

Initially (at essentially 0 time elapsed) the average of leakage was 0.14 nA/$\mu$F·V at 25 deg. C. and 1.29 nA/$\mu$F·V at 85 deg. C. After 40 hours of aging at 85 deg. C. with an applied bias of 6.1V, the average of leakage was 1.44 nA/$\mu$F·V and at 25 deg. C. the average of leakage was 0.18 nA/$\mu$F·V. There were no shorts, voltage breakdown, ignition or other runaway conditions among the 40 capacitors. All the items were below the established threshold of the industry of 2.5 nA/$\mu$F·V.

The results demonstrate an improved process for making tantalum nitride (TaN) by removing the oxygen in the tantalum feedstock by magnesium deoxidation prior to nitriding. The tantalum nitride can be used as the substrate for making solid electrolyte capacitors with electrical quality comparable to that of devices made using tantalum as the substrate. The tantalum nitride-anodic tantalum oxide film interface is thermodynamically more stable than the tantalum-anodic tantalum oxide interface as evidenced by the lack of a bias dependence of capacitance after heat treatment for the tantalum nitride substrate system.

Example 7

The appended published paper (Tripp, Creasi and Cox "Tantalum Nitride: A New Substrate For Solid Electrolyte Capacitors"), including all its text, footnotes (and the publications and presentations defined thereby) and drawings is incorporated herein by reference as though set out at length herein. The disclosure overlaps in part with the preceding Examples but also includes additional information.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Capacitor electrode material comprising a substrate metal nitride compound with a film of oxide of the metal at the surface of substrate, and an interface therebetween, the substrate and the oxide film having a thermodynamically stable substrate-oxide film interface that as a whole when constructed, heat treated, and tested as a capacitor has low bias dependence of capacitance, low temperature dependence of capacitance and low frequency dependence of capacitance, all relative to capacitors based on an analog metal (un-nitrided) substrate that is of similar size, morphology and construction and subjected to similar heat treatment conditions.

2. The powder of claim 1 wherein the refractory metal nitride is selected from the group consisting of substantially (atomic basis) TaN, Ta$_2$N, and NbN.

3. An electrolytic capacitor anode comprising the powder of claim 2.

4. A wet electrolytic capacitor comprising the anode of claim 3.

5. A solid electrolyte capacitor comprising the anode of claim 3.

6. Material as set forth in claim 1 in powder form.

7. Material as set forth in claim 1 selected from the group consisting of tantalum nitride and niobium nitride compounds and mixtures thereof.

8. Material as set forth in claim 7 in powder form.

9. A capacitor anode comprising the material of any one of claims 1, 6, 7, or 8.

10. A capacitor comprising the anode of claim 9.

11. A refractory metal nitride powder suitable as a substrate for an electrolytic capacitor comprising a refractory metal powder wherein the powder has an ignition energy that is substantially increased as compared to an un-nitrided metal analog and wherein the powder has reduced flammability and the powder provides a finished capacitor containing the powder reduced ignition failures.

* * * * *